(12) United States Patent
Maehara

(10) Patent No.: US 6,550,718 B2
(45) Date of Patent: Apr. 22, 2003

(54) AIRCRAFT ENGINE

(75) Inventor: Toshiyuki Maehara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/829,881

(22) Filed: Jul. 13, 2001

(65) Prior Publication Data

US 2003/0010865 A1 Jan. 16, 2003

(51) Int. Cl.⁷ ............................. B64D 27/00; F01N 3/00
(52) U.S. Cl. .................. 244/53 R; 60/288; 244/62
(58) Field of Search ................. 60/288; 244/53 R, 244/62

(56) References Cited

U.S. PATENT DOCUMENTS

| | | | | |
|---|---|---|---|---|
| 3,865,212 A | * | 2/1975 | Mcdonald | |
| 3,905,564 A | * | 9/1975 | Furlano | 244/53 R |
| 3,963,447 A | * | 6/1976 | Hayashi | 60/288 |
| 4,519,563 A | * | 5/1985 | Tamura | 244/53 R |
| 5,085,050 A | * | 2/1992 | Katoh | 60/288 |
| 6,374,599 B1 | * | 4/2002 | Thomas | |

FOREIGN PATENT DOCUMENTS

| | | | | |
|---|---|---|---|---|
| DE | 2343754 | * | 9/1972 | 60/288 |
| DE | 2322993 | * | 5/1973 | 60/288 |
| DE | 3433606 A | * | 9/1984 | 60/288 |
| DE | 3321232 | * | 12/1984 | 600/288 |
| DE | 3328491 | * | 2/1985 | 60/288 |
| DE | 3435706 A | * | 4/1986 | 60/288 |
| DE | 3436274 | * | 4/1986 | 60/288 |
| DE | 3436274 A | * | 4/1986 | 60/288 |
| EP | 0808999 A1 | * | 11/1997 | 60/288 |
| JP | U 57-44925 | | 8/1980 | |
| JP | 57210116 | * | 12/1982 | 60/288 |
| JP | 59126017 | * | 7/1984 | 60/288 |
| JP | 59145318 | * | 8/1984 | 60/288 |
| JP | 59173515 | * | 10/1984 | 60/288 |
| JP | U 62-82317 | | 5/1987 | |
| JP | A 62-126217 | | 6/1987 | |
| JP | 1200010 | * | 8/1989 | 60/288 |
| JP | A 5-296030 | | 11/1993 | |
| JP | A 5-321644 | | 12/1993 | |
| JP | A 9-125941 | | 5/1997 | |
| WO | WO 9318285 | * | 9/1993 | 60/288 |

* cited by examiner

Primary Examiner—Michael J. Carone
Assistant Examiner—Lulit Semunegus
(74) Attorney, Agent, or Firm—Oliff & Berridge, PLC

(57) ABSTRACT

An aircraft engine includes an exhaust gas purifying device for purifying exhaust gas from the engine, and a switching device for switching the engine between an emission-emphasized mode in which the exhaust gas from the engine is purified by the exhaust gas purifying device and an output-emphasized mode in which emphasis is placed on engine output.

18 Claims, 5 Drawing Sheets

AIRCRAFT ENGINE

BACKGROUND OF THE INVENTION AND DESCRIPTION OF THE RELATED ART

The present invention relates to an aircraft engine and, in particular, to an aircraft engine capable of purifying the exhaust gas as needed according to the engine operating condition.

The exhaust gas from vehicles contributes to air pollution, and the permissible concentration values of air pollutants, such as hydrocarbon (CO) and nitrogen oxides (NOx) contained in the exhaust gas have been controlled by laws and regulations. To comply with these laws and regulations, exhaust gas purifying devices are mounted in vehicle engines.

Like vehicles, aircraft emit exhaust gas from their engines. However, this exhaust gas is under no legal control. Since the exhaust gas from aircraft at the time of preparing for takeoff and landing contributes to air pollution in the neighborhood of the airport, it is desirable that the exhaust gas from aircraft be purified like the exhaust gas from vehicles.

However, in aircraft, it is essential that a desired speed and altitude can be ensured in the air, and aircraft should be able to output a desired engine power. Providing an aircraft engine with an exhaust gas purifying device results in a reduction in engine power. Thus, no measures have been taken to purify the exhaust gas from aircraft engines.

SUMMARY OF THE INVENTION

It is accordingly an object of the present invention to provide an aircraft engine which is capable of purifying the exhaust gas to thereby mitigate air pollution in the neighborhood of an airport and which can provide a desired engine power during flight.

Another object of the present invention is to provide an aircraft engine which involves no increase in aircraft weight and does not affect the flight condition and which is capable of mitigating air pollution in the neighborhood of an airport.

Still another object of the present invention is to provide an aircraft engine in which an engine control mechanism is appropriately controlled on the basis of information from a detection means for detecting the aircraft condition to thereby reduce the amount of pollutant in the exhaust gas and which is capable of providing a maximum engine output as needed.

To achieve the above objects, according to a first aspect of the present invention, there is provided an aircraft engine comprising an exhaust gas purifying device for purifying exhaust gas from the engine, and a switching means for switching the engine between an emission-emphasized mode in which the exhaust gas from the engine is purified by the exhaust gas purifying device and an output-emphasized mode in which emphasis is placed on engine output.

Thus, in the aircraft engine of the present invention, when the emission-emphasized mode is selected by the switching means, the exhaust gas from the engine is purified by the exhaust gas purifying device. When the output-emphasized mode is selected by the switching means, emphasis is placed on the engine output, and the engine is operated so that a maximum output can be achieved.

As a result, an aircraft engine is provided which can purify the exhaust gas from the engine to thereby prevent air pollution and which is capable of ensuring a desired engine output as needed.

According to a second aspect of the present invention, the switching means is controlled on the basis of detection results obtained by a detecting means for detecting whether the aircraft is in a pre-takeoff/post-landing state or a flight state. When the aircraft is in the pre-takeoff/post-landing state, the engine is operated in the emission-emphasized mode, and when the aircraft is in the flight state, the engine is operated in the output-emphasized mode.

Thus, according to the second aspect of the present invention, the detecting means detects the state of the aircraft, that is, detects whether the aircraft is in the pre-takeoff/post-landing state or the flight state to control the operation of the switching means.

Thus, according to the second aspect of the present invention, when the aircraft is in the pre-takeoff/post-landing state, the engine is operated in the emission-emphasized mode, and when the aircraft is in the flight state, the engine is operated in the output-emphasized mode.

According to a third aspect of the invention, the detecting means detects whether the aircraft is at rest on the ground with the engine operating, or the aircraft is moving on the ground at low speed, or the aircraft is flying. When the detecting means detects that the aircraft is at rest on the ground with the engine operating, or it is moving on the ground at low speed, the engine is operated in the emission-emphasized mode. When the detecting means detects that the aircraft is flying, the engine operation is switched to the output-emphasized mode.

Thus, in the third aspect of the present invention, the detecting means detects whether the aircraft is at rest on the ground, with the engine running at idle, or it is moving at, for example, an airport to a predetermined runway, that is, performing so-called taxiing, or it is flying. When the aircraft is at rest on the ground, with the engine running at idle, or it is moving at, for example, an airport to a predetermined runway, that is, performing so-called taxiing, the engine is operated in the emission-emphasized mode. When the detecting means detects that the aircraft is flying, the engine is operated in the output-emphasized mode.

Thus, according to the third aspect of the present invention, when no great engine power is required and it is necessary to prevent air pollution in the neighborhood as in the case in which the aircraft is at rest on the ground, with the engine running at idle, or performing taxiing or the like, the switching means is controlled on the basis of the detection results obtained by the detecting means so as to operate the engine in the emission-emphasized mode.

On the other hand, when a predetermined great engine output is required as in the case in which the aircraft is starting to fly and taxiing, or rising to a predetermined altitude, or cruising at the predetermined altitude or the like, the detecting means detects it, and controls the switching means accordingly so that the engine may be operated in the output-emphasized mode. Thus, it is possible to obtain a desired great engine output whenever it is required, so that the flight is not adversely affected.

According to a fourth aspect of the present invention, the exhaust gas purifying device is provided so as to be branched off from a first exhaust passage for discharging the exhaust gas to the exterior of the aircraft, and has a second exhaust passage for discharging the exhaust gas to the exterior of the aircraft and an exhaust purifying catalyst provided in the second exhaust passage.

Thus, in the fourth aspect of the present invention, when the engine exhaust gas is purified in the emission-emphasized mode, the exhaust gas flows into the second exhaust passage to be purified by the exhaust purifying catalyst before it is discharged to the exterior of the aircraft.

As a result, in the fourth aspect of the present invention, the exhaust gas discharged from the aircraft engine is purified by the exhaust purifying catalyst provided in the exhaust passage.

According to a fifth aspect of the present invention, the switching means is provided at the branch point between the first exhaust passage for discharging the exhaust gas to the exterior of the aircraft and the second exhaust passage having the exhaust purifying catalyst and adapted to discharge the exhaust gas after purifying it, and is formed by an exhaust passage switching means capable of introducing the exhaust from the engine into the first exhaust passage or the second exhaust passage.

Thus, in the fifth aspect of the present invention, the switching means is operation-controlled to change its position on the basis of the detection result obtained by the detecting means, thereby causing the exhaust gas from the engine to flow into the first exhaust passage or the second exhaust passage.

As a result, in the fifth aspect of the present invention, in the emission-emphasized mode, the exhaust from the engine is introduced into the second exhaust passage by the switching means, and the exhaust gas is purified by the exhaust purifying catalyst provided in the second exhaust passage. In the output-emphasized mode, the exhaust from the engine is introduced into the first exhaust passage, and the exhaust gas is discharged without being purified.

According to a sixth aspect of the present invention, the detecting means is provided outside the aircraft and formed by a wing-like member adapted to be operated by an airflow from the front side of the aircraft.

Thus, in the sixth aspect of the present invention, when the aircraft is running on the ground at a predetermined speed, or flying, it receives an airflow of a predetermined pressure, whereby the detecting means formed by a wing-like member is driven to control the operation of the switching means. On the other hand, when the aircraft is at rest on the ground or taxying at low speed, it does not receive the airflow of a predetermined pressure, so that the detecting means formed by a wing-like member is not driven, and controls the switching means accordingly.

According to a seventh aspect of the present invention, the exhaust flow passage switching means is driven by the wing-like member, and when the aircraft is in the pre-takeoff or post-landing state, the wing-like member does not operate and the emission-emphasized mode is selected, the exhaust flow passage switching means being arranged at the branching point so as to be capable of introducing the exhaust gas into the first exhaust passage; when the aircraft is in the flight state, the output-emphasized mode is selected and the wing-like member is operated by lift to drive the exhaust flow passage switching means, the exhaust flow-passage switching means being arranged at the branching point so as to be capable of introducing the exhaust gas into the second exhaust passage.

Thus, in the seventh aspect of the present invention, when aircraft is in the pre-takeoff or post-landing state, the wing-like member receives no airflow at a predetermined pressure so that it does not operate, the exhaust gas being introduced into the first exhaust passage. On the other hand, when the aircraft is in the flight state, the wing-like member is operated by lift generated to drive the exhaust flow passage switching means, thereby introducing the exhaust gas into the second exhaust passage. Since the exhaust purifying catalyst is provided in the second exhaust passage, the exhaust gas is purified before it is discharged during flight.

As a result, in the seventh aspect of the present invention, the exhaust flow passage switching means is driven by the wing-like member, so that when the aircraft is at rest on the ground or taxying at low speed, the emission-emphasized mode is selected, and the exhaust gas is introduced into the second exhaust passage to be purified. When the aircraft is running on the ground at a predetermined speed or flying, the output-emphasized mode is selected and the exhaust gas is introduced into the first exhaust passage to be discharged without being purified.

According to an eighth aspect of the present invention, the switching means is provided with an intake air heating device and an intake air throttle valve, and there is provided an intake air flow passage switching means capable of switching between an intake air passage for supplying intake air to the engine main body by way of the intake air heating device and an intake air passage for supplying intake air to the engine main body without passing it through the intake air heating device and the intake air throttle valve.

Thus, in the eighth aspect of the present invention, an intake air heating device is provided in one intake air passage, so that when intake air is supplied into this intake air passage when the temperature is low or in a cold state, the intake air is heated to undergo temperature rise, thereby preventing generation of white smoke and reducing the amount of THC discharged. Further, since an intake air throttle value is provided, the intake air amount is appropriately adjusted, and it is possible to control the amount of exhaust gas recirculated by an exhaust gas recirculating device (EGR).

As a result, in the emission-emphasized mode, the operation of the intake air flow passage switching means is controlled to supply intake air to the intake air passage where the intake air heating device is provided, thereby reducing the amount of air pollutant in the exhaust gas. Further, the intake air amount is appropriately controlled by the intake air throttle valve, and it is possible to reduce the generation of NOx (nitrogen oxides) by means of the exhaust gas recirculating device (EGR).

In the output-emphasized mode, the operation of the intake air flow passage switching means is controlled to introduce intake air into the intake air passage where no intake air heating device is provided, and intake air is directly supplied to the engine main body without passing it through the intake air heating device and the intake air throttle valve, whereby the intake resistance of the intake air is reduced, and it is possible to obtain an appropriate engine power output and to achieve an improvement in fuel efficiency.

According to a ninth aspect of the present invention, the exhaust gas purifying device is provided in the intake air passage for supplying intake air to the engine main body, and is formed by the intake air heating device capable of raising the temprature of the intake air.

Thus, in the ninth aspect of the present invention, the intake air heating device is provided in the intake air passage leading to the engine main body, so that when intake air is supplied to this intake air passage at low temperature or in a cold state, the intake air is heated to undergo temperature rise, thereby preventing generation of white smoke and reducing the amount of THC discharged. Thus, in the case of the emission-emphasized mode, the air pollutant in the exhaust gas is removed.

According to a tenth aspect of the present invention, the engine is formed by a diesel engine, and the exhaust gas purifying device is formed by a glow plug for heating an engine combustion chamber.

Thus, in the tenth aspect of the present invention, in the emission-emphasized mode, the glow plug assists in igniting the diesel engine, so that at low temperature or in a cold state, generation of white smoke at the engine start is prevented, whereby the amount of THC discharged is reduced and it is possible to achieve an improvement in fuel economy.

According to an eleventh aspect of the present invention, the exhaust gas purifying device is formed by a fuel injection control mechanism capable of controlling the fuel injection state so as to reduce the discharge amount of air pollutant in the exhaust gas.

Thus, in the eleventh aspect of the present invention, in the emission-emphasized mode, the fuel injection control mechanism controls fuel injection amount, fuel injection timing (including injection during exhaust stroke or the like), fuel injection pattern (injection ratio control in pilot injection, two-stage injection, delta-type injection or the like) so as to reduce the air pollutant in the exhaust gas, and the discharge amount of THC, CO, NOx, SPM, smoke, $CO_2$ or the like in the exhaust gas is reduced through optimum fuel injection and combustion.

On the other hand, in the output-emphasized mode, the fuel injection control mechanism controls fuel injection amount, fuel injection timing (including injection during exhaust stroke or the like), fuel injection pattern (injection ratio control in rectangular injection, pilot injection, two-stage injection, delta-type injection or the like) so as to obtain maximum engine output.

According to a twelfth aspect of the present invention, the exhaust gas purifying device is formed by a suction/exhaust valve control mechanism capable of controlling the valve timing to change so as to reduce the discharge amount of air pollutant in the exhaust gas.

Thus, in the twelfth aspect of the present invention, the suction/exhaust valve control mechanism is capable of setting an optimum valve timing according to the operating condition. In the emission-emphasized mode, the suction/exhaust valve control mechanism controls to change the valve timing so as to make it possible to reduce the discharge amount of air pollutant in the exhaust gas. At low temperature or in a cold state, it delays the opening of the intake air valve to raise the intake air temperature in the cylinder to prevent generation of white smoke. When the engine is running at idle or at low speed, it advances the closing of the intake air valve to prevent blow-by of the gas, and, by increasing the real compression ratio, prevents white smoke, reduces the discharge amount of THC, achieves an improvement in fuel consumption ratio, etc., whereby the discharge amount of air pollutant in the exhaust gas is reduced.

Further, in the output-emphasized mode, the suction/exhaust valve control mechanism appropriately controls the valve timing so that a maximum engine output may be obtained, and, when the engine is running at high speed, it delays the closing of the intake air valve to thereby increase the volumetric efficiency, making it possible to obtain maximum output.

According to a thirteenth aspect of the present invention, the exhaust gas purifying device is formed by an ignition control mechanism capable of changing the ignition period so that the discharge amount of air pollutant in the exhaust gas may be reduced.

Thus, in the thirteenth aspect of the present invention, in the emission-emphasized mode, the ignition control mechanism controls the ignition timing of the ignition device to realize an optimum ignition period, thereby reducing the discharge amount of air pollutant in the exhaust gas.

Further, in the output-emphasized mode, the ignition control mechanism appropriately realizes an ignition period which allows a maximum engine output to be obtained.

According to a fourteenth aspect of the present invention, the exhaust gas purifying device is formed by an exhaust gas recirculating device which recirculates the exhaust gas to use it as intake air.

Thus, in the fourteenth aspect of the present invention, in the emission-emphasized mode, the exhaust gas is recirculated by the exhaust gas recirculating device and supplied again to the cylinder with air-fuel mixture. As a result, the temperature in the combustion chamber decreases, and the generation of NOx is reduced.

According to a fifteenth aspect of the present invention, the exhaust gas recirculating device has an exhaust gas recirculating valve.

Thus, in the fifteenth aspect of the present invention, the exhaust gas recirculating device has an exhaust gas recirculating valve, so that it adjusts the amount of gas recirculated to achieve an optimum EGR ratio for each operating condition, thereby reducing the discharge amount of NOx, THC, CO, SPM, etc.

According to a sixteen aspect of the present invention, the exhaust gas recirculating device is provided with an exhaust gas recirculating cooler.

Thus, in the sixteen aspect of the present invention, the exhaust gas recirculating cooler cools the exhaust gas used for the recirculation of the exhaust gas, and lowers the maximum combustion temperature at the time of combustion, thereby reducing the discharge amount of NOx.

According to a seventeenth aspect of the present invention, in the exhaust gas recirculating device, the amount of exhaust gas recirculated is controlled by the intake air throttle valve.

Thus, in the seventeenth aspect of the present invention, the intake air amount is adjusted by the intake air throttle valve, and the amount of exhaust gas recirculated by the exhaust gas recirculating device (EGR) is appropriately controlled.

According to an eighteenth aspect of the present invention, the exhaust gas purifying device is formed by an exhaust throttle valve which is provided in the second exhaust passage and is capable of reducing the discharge amount of air pollutant.

Thus, in the eighteenth aspect of the present invention, in the emission-emphasized mode, the back pressure of exhaust gas is increased to control the exhaust gas recirculation ratio, and the engine load is increased to improve the warming-up property and prevent generation of white smoke.

According to a nineteenth aspect of the present invention, the exhaust gas purifying device is formed by an exhaust filter which is provided in the second exhaust passage and is capable of reducing the discharge amount of air pollutant.

When the engine is a diesel engine, an SPM removal filter is adopted as the exhaust filter. Thus, in the nineteenth aspect of the present invention, in the emission-emphasized mode, it is possible to achieve a reduction in SPM (particulate substance) peculiar to the exhaust gas from a diesel engine.

DETAILED DESCRIPTION OF THE PREFERRED EMBODIMENTS

Embodiments of the present invention will now be described in detail with reference to the accompanying drawings.

Figure 1:
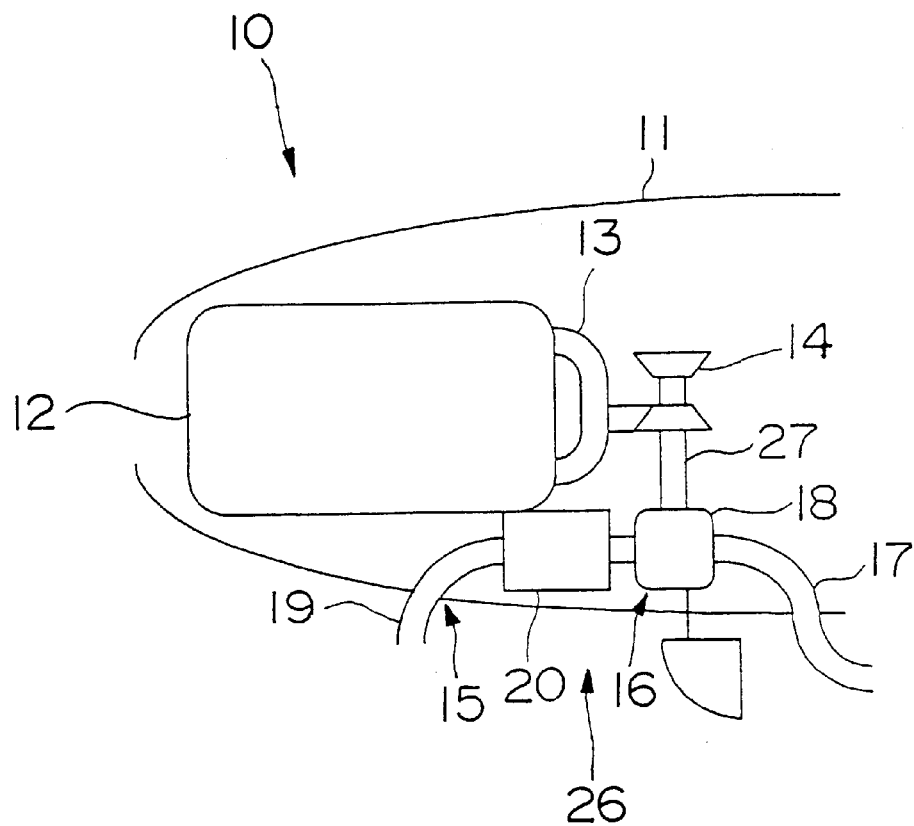
FIG. 1 is a conceptual rendering of an aircraft engine according to an embodiment of the present invention, showing in plan view an engine exhaust system and an exhaust gas purifying device according to an embodiment of the present invention.
Figure 2:
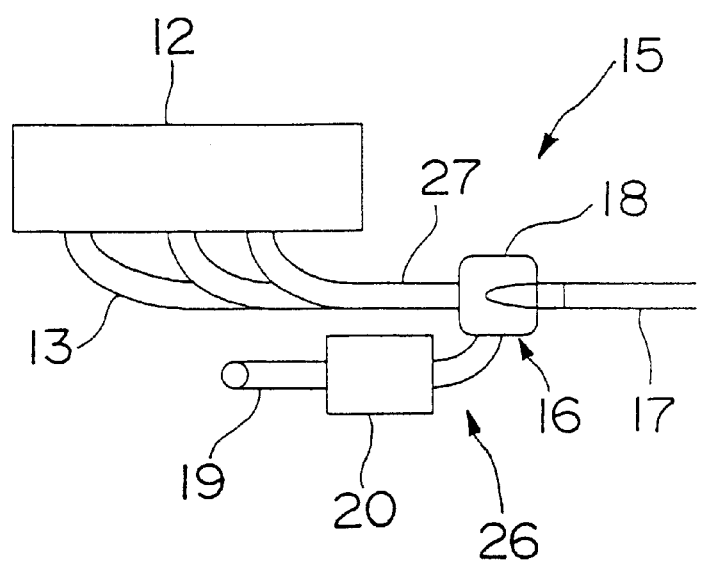
FIG. 2 is a conceptual rendering of an aircraft engine according to an embodiment of the present invention, showing in side view an engine exhaust system and an exhaust gas purifying device according to an embodiment of the present invention.

As shown in FIGS. 1 and 2, an aircraft engine 10 according to an embodiment of the present invention includes an engine main body 12 arranged inside an engine cowl 11 and consisting of an Otto cycle engine or a diesel engine, an exhaust manifold 13 provided on the engine main body 12, and an exhaust pipe 15 connected to the exhaust manifold 13 through a turbo charger 14.

In this embodiment, the exhaust pipe 15 is formed by an exhaust pipe main body portion 27, an exhaust non-purifying passage portion 17 branching off in a T-shaped manner from the forward end portion of the exhaust pipe main body portion 27 and serving as a first exhaust passage, and an exhaust purifying passage portion 19 serving as a second exhaust passage. At the branching point 16, there is provided an exhaust flow passage switching means 18 serving as the switching means.

The exhaust non-purifying passage portion 17 is arranged so as to extend to the outer side of the engine cowl 11 to open toward the rear side of the engine cowl 11 and is adapted to discharge the exhaust gas from the engine main body 12 backward to the exterior without purifying it.

The exhaust purifying passage portion 19 extends to the front side of the engine cowl 11 and is arranged so as to open on a side of the engine cowl 11 at a position on the front side with respect to the exhaust non-purifying passage portion 17.

In this embodiment, the exhaust gas purifying device 26 is formed by an exhaust purifying catalyst 20 and the exhaust purifying passage portion 19 capable of purifying the exhaust gas through the exhaust purifying catalyst 20 before discharging it to the exterior of the aircraft.

And, provided in the exhaust purifying passage portion 19 is the exhaust purifying catalyst 20 capable of purifying the exhaust gas. When the engine main body 12 is an Otto cycle engine, the exhaust purifying catalyst 20 consists of 3-way catalyst. When the engine is a diesel engine, the catalyst consists of an oxidation catalyst or an oxidation catalyst for removing white smoke.

Figure 3:
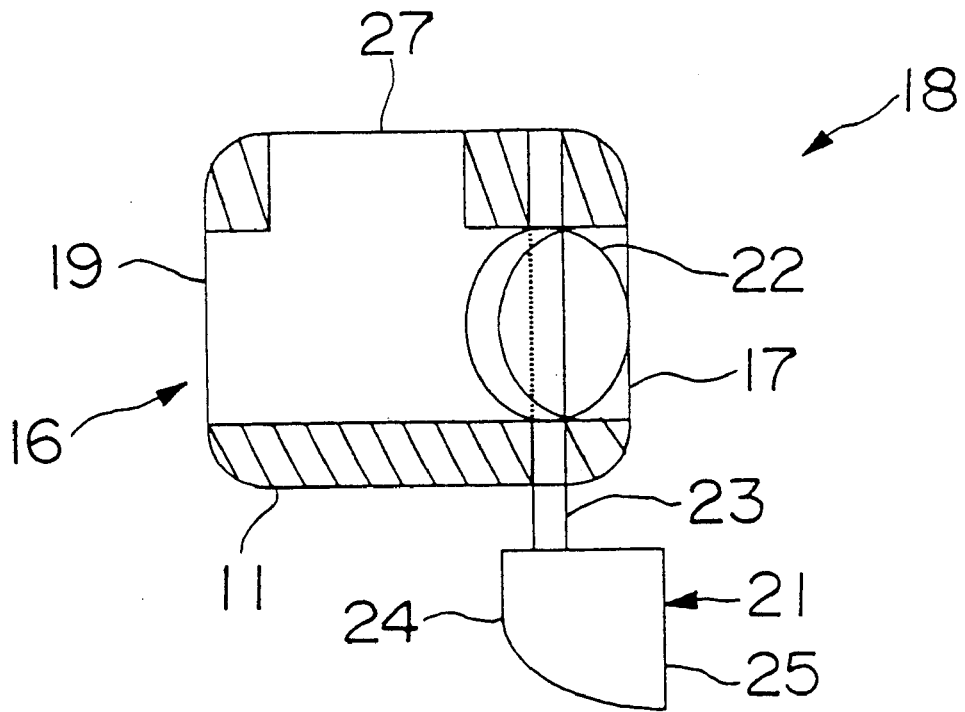
FIG. 3 is a conceptual rendering in plan view of an embodiment of the exhaust flow passage switching means of an exhaust gas purifying device according to the present invention, showing a state in which an aircraft engine is running at idle after landing.

As shown in FIG. 3, the exhaust flow passage switching means 18 is arranged near the inlet of the exhaust non-purifying passage portion 17 arranged substantially perpendicular to the end portion of the exhaust pipe main body portion 27, and has a valve 22 capable of opening or closing the exhaust non-purifying passage portion 17. The central portion with respect to the width direction of the valve 22, whose general configuration is substantially elliptical, is supported by a shaft portion 23 so as to be rotatable in the exhaust non-purifying passage portion 17. The valve is opened and closed by a wing-like member 21 serving as a detecting means through the shaft portion 23.

This wing-like member 21 is arranged on the outer side of the engine cowl 11, and receives an airflow at a predetermined speed from the front side of the aircraft to thereby detect whether the aircraft is in the pre-takeoff or post-landing state or the flight state, opening or closing the valve 22, whereby the operation of the engine can be switched between the two modes: the emission-emphasized mode in which the exhaust gas from-the engine main body 12 is purified by the exhaust gas purifying device 26, and the output-emphasized mode in which emphasis is placed on the output of the engine main body 12.

Figure 4:
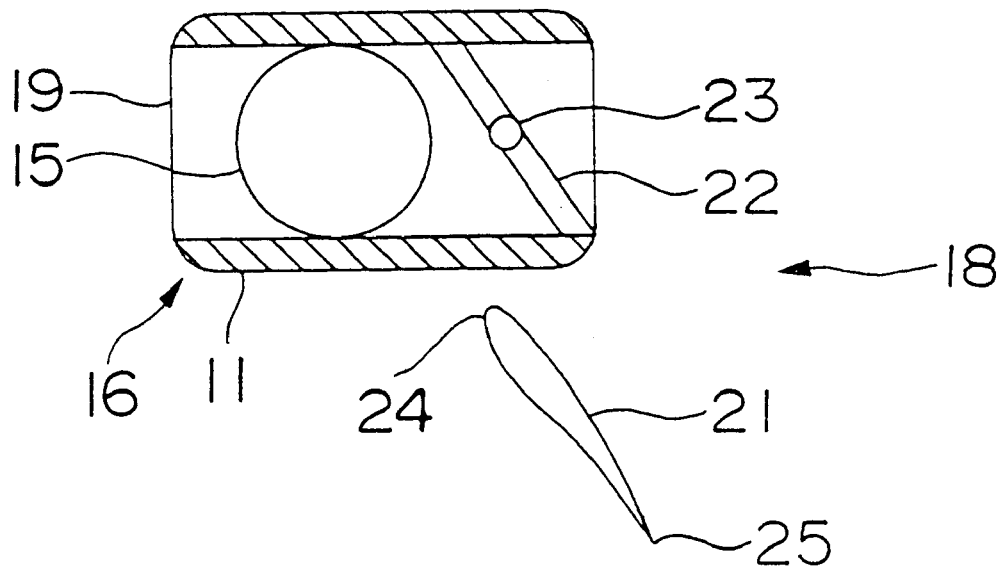
FIG. 4 is a conceptual rendering in side view of an embodiment of the exhaust flow passage switching means of an exhaust gas purifying device according to the present invention, showing a state in which an aircraft engine is running at idle after landing.
Figure 6:
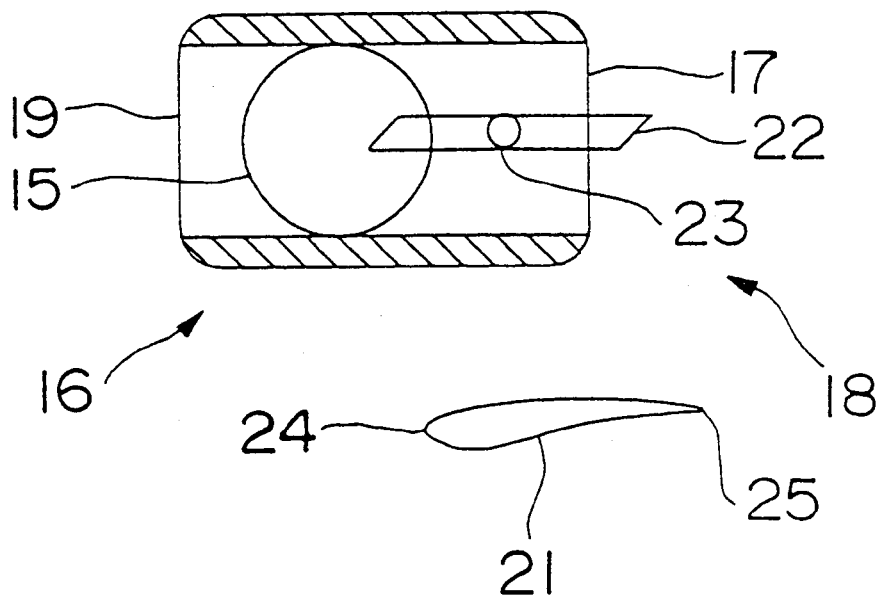
FIG. 6 is a conceptual rendering in side view of an embodiment of the exhaust flow passage switching means of an exhaust gas purifying device according to the present invention, showing a state in which an aircraft is running on the ground at a speed not lower than a fixed speed or flying.

As shown in FIGS. 4 and 6, the cross-sectional configuration of the wing-like member 21 is substantially the same as that of an aircraft wing. It has a relatively thick front end portion 24 and is tapered toward the rear end portion 25. Thus, when it receives an airflow from the front side, it can develop lift. The front end portion 24 of the wing-like member 21 is connected to the valve 22 through the shaft portion 23 such that their mounting angles are the same.

Thus, the wing-like member 21, whose front end portion 24 is connected to the shaft portion 23, has a larger weight balance on the rear end portion 25 side. As a result, when the aircraft is not in flight but at rest on the ground or moving on the ground at low speed, the rear end portion 25 droops by a predetermined angle, as shown in FIG. 4. And, the valve 22, which is fixed to the shaft portion 23 so as to be at the same angle as the wing-like member 21, closes the exhaust non-purifying passage portion 17 to thereby set the engine in the emission-emphasized mode.

Figure 5:
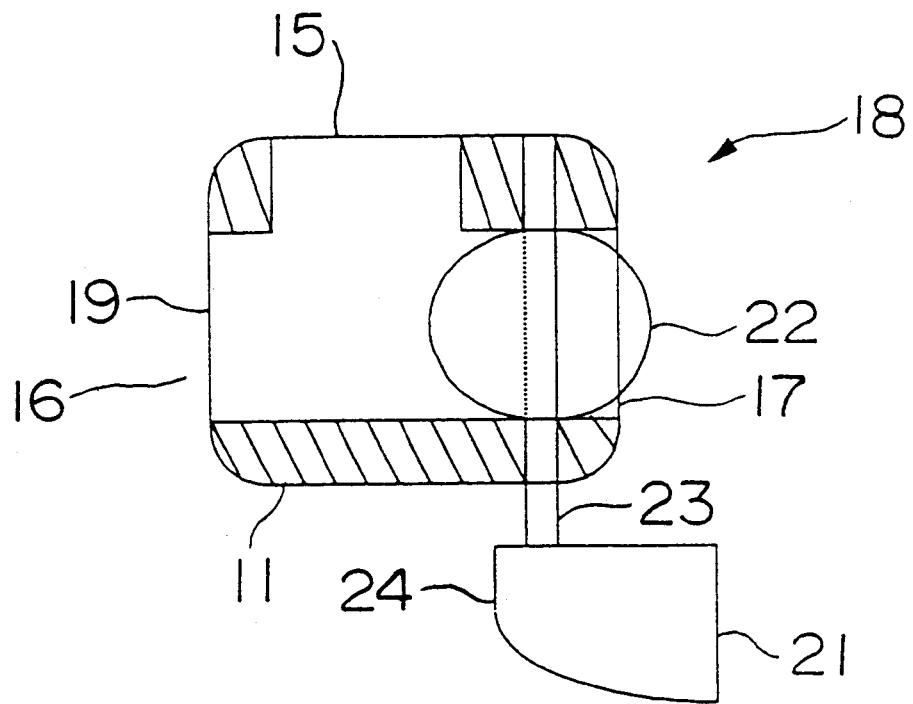
FIG. 5 is a conceptual rendering in plan view of an embodiment of the exhaust flow passage switching means of an exhaust gas purifying device according to the present invention, showing a state in which an aircraft is running on the ground at a speed not lower than a fixed speed or flying.

On the other hand, when the aircraft is flying at a speed not lower than a fixed speed, the wing-like member receives an airflow from the front side, and is, rotated, by the lift developed, counterclockwise around the shaft portion 23, with the result that the rear end portion 25 is raised, thereby maintaining the substantially horizontal position as shown in FIG. 6. As a result, the valve 22 is also rotated counterclockwise through the shaft portion 23, and assumes the substantially horizontal position as shown in FIGS. 5 and 6 to thereby set the engine in the output-emphasized mode in which the inlet opening of the exhaust non-purifying passage portion 17 is open.

The operation of the aircraft engine 10 of this embodiment will now be described.

In the aircraft engine 10 of this embodiment, when the aircraft is on the ground and its engine is running at idle or when the aircraft is performing so-called taxying to move at low speed to a predetermined runway or hangar before taking off or after landing, the rear end portion 25 of the wing-like member 21 constituting the exhaust flow passage switching means 18 is drooping due to the balance of the center of gravity as shown in FIGS. 3 and 4, and the valve 22 fixed to the shaft portion 23 at the same angle as the wing-like member 21 closes the exhaust non-purifying passage portion 17 to set the engine in the emission-emphasized mode.

Thus, when the engine 10 is started, the exhaust gas from the engine main body 12 flows through the exhaust manifold 13, the turbo charger 14, and the exhaust pipe main body portion 27 to reach the branching point 16. In this case, the exhaust non-purifying passage portion 17 is closed by the valve 22, so that all the exhaust gas flows to the exhaust purifying passage portion 19 side. Since the exhaust purifying catalyst 20 is provided in the exhaust purifying passage portion 19, the exhaust gas is purified when it passes the exhaust purifying catalyst 20, and the air pollutant is removed from the exhaust gas before it is discharged to the exterior of the engine cowl 11 through the opening at the forward end of the exhaust purifying passage portion 19.

As a result, it is possible to effectively prevent air pollution in the neighborhood of the airport due to the exhaust gas from the aircraft when it is at the airport as in the case in which the aircraft engine is running at idle or in which the aircraft is performing taxying. In particular, in the case of a diesel engine, it is possible to eliminate generation of white smoke by using the exhaust purifying catalyst 20 at the moment immediately after starting in a cold state, when white smoke is liable to be generated, and during the warming-up operation in which the engine is running at idle.

On the other hand, when the aircraft raises its engine power to prepare for taking off and starts to run, its speed is increased, and the speed of the airflow from the front side of the aircraft also increases. As a result, as shown in FIGS. 5 and 6, the wing-like member 21 receives the airflow from the front side, and its rear end portion 25 is gradually raised by the lift developed to rotate counterclockwise around the shaft portion 23, thereby reaching the substantially horizontal state. In this case, the valve 22 connected to the wing-like member 21 through the shaft portion 23 so as to be at the same angle as the wing-like member rotates by the same angle to thereby open the inlet opening of the exhaust non-purifying passage 17, effecting transition to the output-emphasized mode.

Since the exhaust purifying catalyst 20 is provided on the exhaust purifying passage portion 19, the increase in engine power results in an increase in the back pressure in the passage in front of the exhaust purifying passage 20, and, at the branching point 16, the exhaust gas flows into the exhaust non-purifying passage 17 to be discharged to the exterior of the aircraft without being passed through the exhaust purifying catalyst 20.

Thus, the exhaust gas does not flow by way of the exhaust purifying catalyst 20 of the exhaust gas purifying device 26, so that it is possible to reduce the exhaust pressure loss due to the back pressure at the time of discharging the exhaust gas. As a result, it is possible to obtain the requisite engine output for taking off, rising or cruising, and to reduce the fuel consumption. When the engine main body 12 consists of a diesel engine, the engine main body 12 is sufficiently warmed up during taking off or flight, so that it is possible to prevent generation of white smoke.

In this embodiment, the exhaust flow passage switching means 18 is formed by the wing-like member 21 arranged outside the aircraft and mechanically controlled by a simple structure utilizing the lift developed. That is, the flow passage switching means 18 does not use any sensor, actuator, control computer or the like, so that it does not involve an increase in the weight of the aircraft, making it possible for the switching between the emission-emphasized mode and the output-emphasized mode to be effected easily and automatically.

Figure 7:
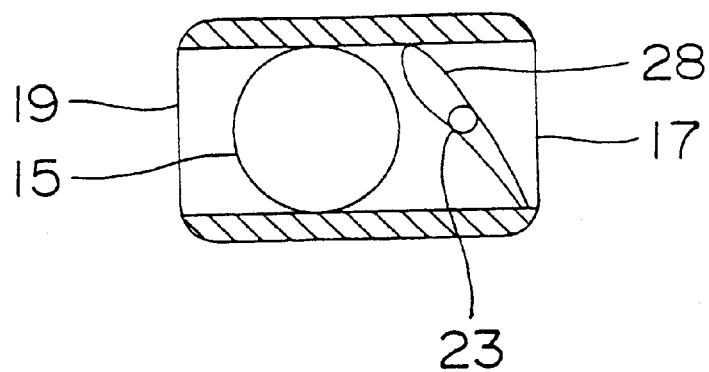
FIG. 7 is a conceptual rendering in side view of another embodiment of the exhaust flow passage switching means of an exhaust gas purifying device according to the present invention, showing a state in which an aircraft engine is running at idle after landing.
Figure 8:
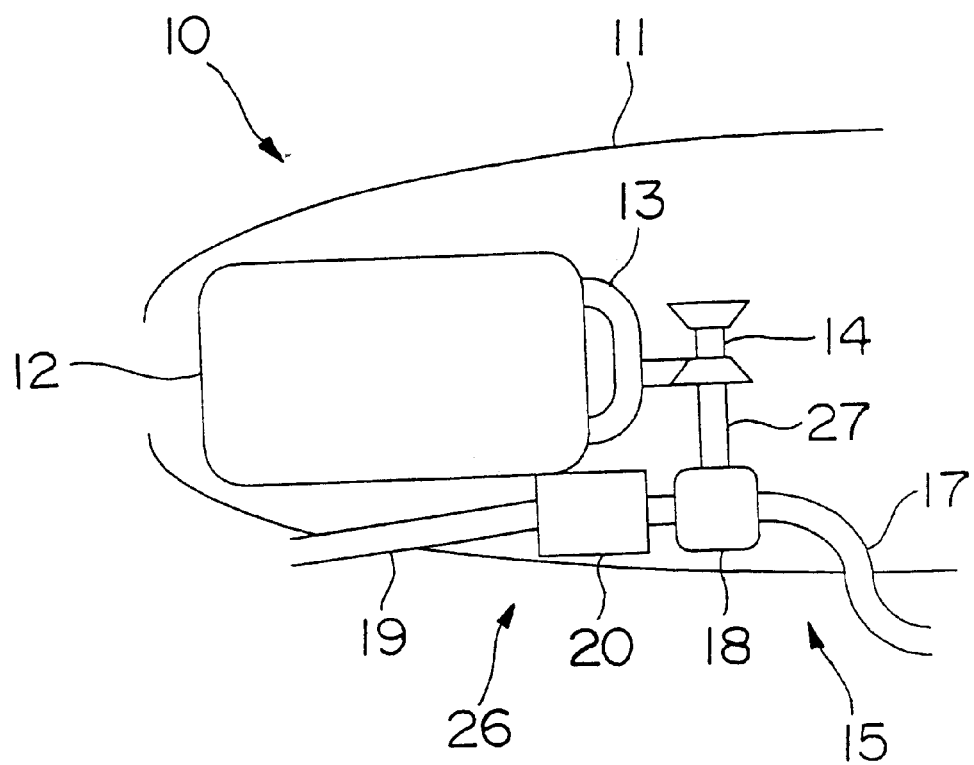
FIG. 8 is a conceptual rendering in plan view of another embodiment of the exhaust flow passage switching means of an exhaust gas purifying device according to the present invention.

FIGS. 7 and 8 show another embodiment of an aircraft engine according to the present invention.

In the aircraft engine 10 of this embodiment, the exhaust purifying passage portion 19 constituting the exhaust pipe 15 protrudes forwardly from the side surface of the engine cowl 11 so as to open toward the front side. Further, a valve 28 constituting the exhaust flow passage switching means 18 is provided at the inlet opening of the exhaust non-purifying passage portion 17, and the valve 28 itself has a wing-like sectional configuration. Apart from this, this embodiment has the same construction as that of the above embodiment.

Thus, in this embodiment, the exhaust purifying passage portion 19 is open toward the front side of the engine cowl 11, so that, when the aircraft is running at a speed higher than a predetermined speed for taking off, or when it is flying at a predetermined altitude, an airflow enters the opening of the exhaust purifying passage portion 19, and passes through the exhaust purifying passage portion 19 to the exhaust non-purifying passage portion 17.

Thus, the valve 28 receives a lift developed by the airflow passing through the exhaust purifying passage portion 19 and the exhaust non-purifying passage portion 17, and rotates around the shaft portion 23, opening and closing the inlet opening of the exhaust non-purifying passage portion 17. Regarding the opening/closing operation, it is the same as that in the above embodiment.

In this embodiment, there is no need to separately provide a wing-like member as in the above-described embodiment, which leads to a reduction in the number of parts, that is, a reduction in cost and, further, a reduction in the aircraft weight.

While in the above embodiments the state of the aircraft is detected by the detecting means formed by the wing-like member 21 to control the switching between the emission-emphasized mode and the output-emphasized mode, the construction of the detecting means is not restricted to the wing-like member 21.

For example, it is also possible for the mode switching to be effected by utilizing the speed or altitude of the aircraft detected by a pitot tube or the like attached to the aircraft as detection data. Further, regarding the detection of the state of the aircraft after taking off or landing or during flight, it is possible to utilize detection results obtained, for example, by a grounding sensor provided on a wheel of the aircraft and adapted to detect whether the aircraft is in contact with the ground or not. Further, it is also possible to effect the mode switching on the basis of the revolution of the number of the engine as detection data by using a predetermined the revolution of the number of the engine engine speed as a reference. Further, the mode switching can also be effected manually by the pilot.

Figure 9:
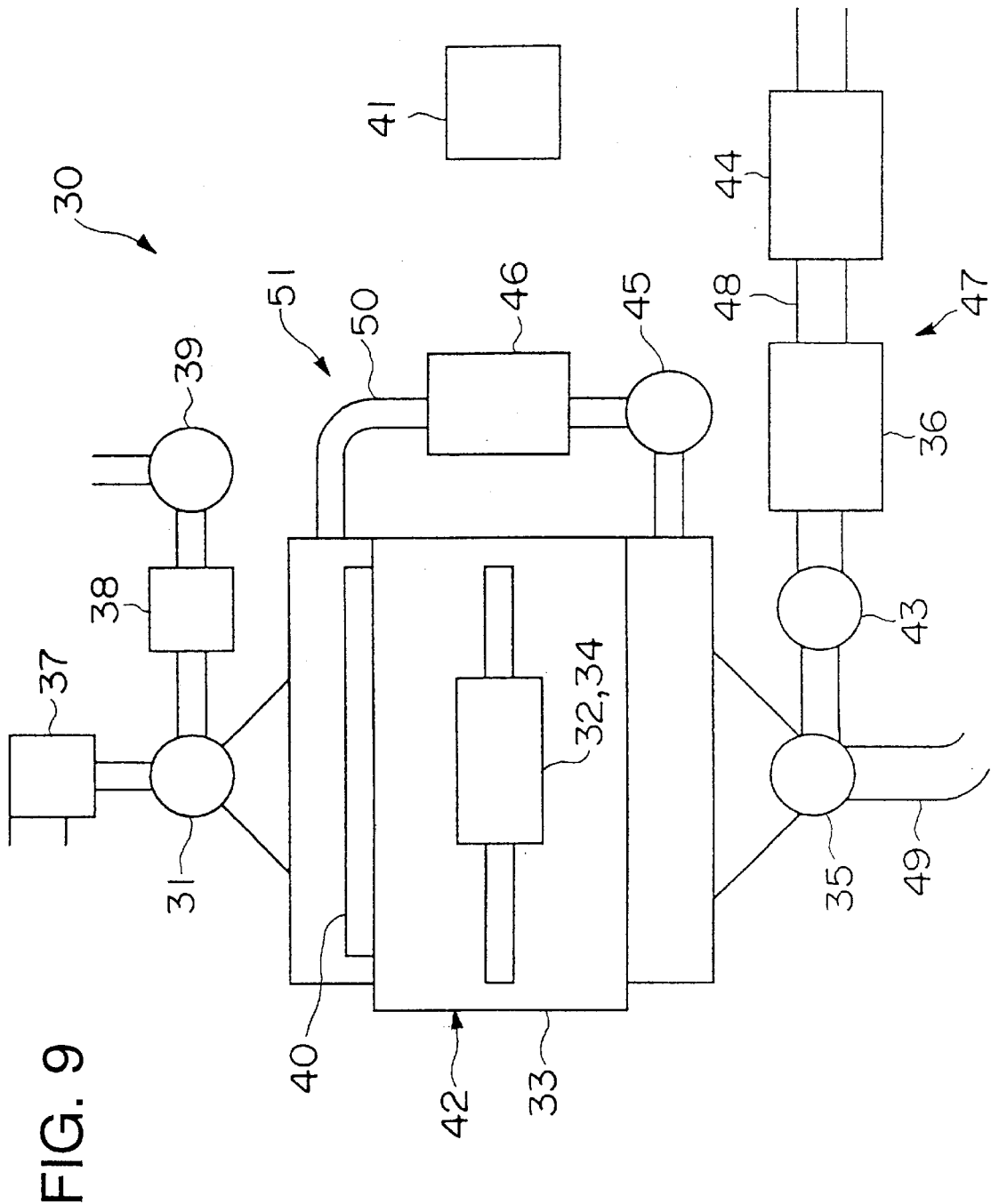
FIG. 9 is a conceptual rendering of an exhaust gas purifying device according to another embodiment of the present invention in which engine control equipment is appropriately controlled through computer control to effect exhaust gas purifying as needed and in which operation is conducted without effecting any exhaust gas purifying when a maximum output is required.

FIG. 9 shows another embodiment of the aircraft engine of the present invention.

The engine of this embodiment consists of a diesel engine, and an exhaust gas purifying device 30 comprises: an intake air flow passage switching means 31 capable of being switched to an intake air passage for reducing the discharge amount of air pollutant in the exhaust gas according to the operating condition of the engine; a fuel injection control mechanism 32 capable of changing the fuel ejection state according to the operating condition so as to reduce the discharge amount of air pollutant in the exhaust gas; a suction/exhaust valve control mechanism 33 capable of changing the valve timing according to the operating condition so as to reduce the discharge amount of air pollutant in the exhaust gas; an ignition control mechanism 34 capable of changing the ignition time according to the operating condition so as to reduce the discharge amount of air pollutant in the exhaust gas; an exhaust gas recirculating device (EGR) 51 for recirculating the exhaust gas as intake air; an exhaust flow passage switching means 35 capable of switching the exhaust passage according to the operating condition so as to purify the exhaust gas; and an exhaust purifying catalyst 36 capable of purifying the exhaust gas.

In this embodiment, there are formed two intake air supply passages to a diesel engine main body 42: a supply passage directly leading to the diesel engine main body 42 from an air purifyer 37 through the intake air flow passage switching means 31, and a supply passage leading to the diesel engine main body 42 by way of an intake air heating device 38. On the intake air side of the intake air heating device 38, there is provided an intake air throttle valve 39. In the emission-emphasized mode, the intake air throttle valve 39 adjusts the intake air amount so as to form a negative pressure on the intake manifold side, and controls the exhaust gas recirculation amount in the exhaust gas recirculating device (EGR), etc.

The intake air heating device 38 may be of electric type or combustion type. Further, it may consist of a hot air intake or the like, which increases the temperature of the intake air at low temperature or in a cold state to prevent generation of white smoke and reduce the THC exhaust amount. And, the intake air switching valve 39 switches the intake air supply passage and, as needed, allows the intake air to pass through the intake air heating device 38 to increase the intake air temperature, thereby preventing generation of white smoke and reducing the THC discharge amount.

A glow plug 40 is attached to the diesel engine main body 42. By heating the engine combustion chamber, the ignition of the engine is assisted, and, at low temperature or in a cold state, generation of white smoke is prevented, the THC discharge amount is reduced, and an improvement in fuel efficiency is achieved.

The fuel injection control mechanism 32 controls the fuel injection amount, fuel injection timing (including injection during exhaust stroke, etc.), and fuel injection pattern (injection ratio control in rectangular injection, pilot injection, two-stage injection, delta-type injection, etc.), thereby making it possible to reduce the discharge amount of THC, CO, NOx, SPM, smoke, $CO_2$, etc. through optimum fuel injection and combustion.

Further, the intake air valve control mechanism 33 is formed by a suction/exhaust valve timing variable mechanism, which realizes the optimum valve timing according to the operating condition. At low temperature or in a cold state, it delays the intake air valve opening time to raise the intake air temperature in the cylinder to thereby prevent generation of white smoke. When the engine is running at idle, or running at low speed, the closing of the intake air valve is advanced to thereby prevent blow-by of the gas, and the actual compression rate is enhanced to thereby prevent white smoke generation, achieve a reduction in the discharge amount of THC, achieve an improvement in fuel efficiency, etc.

The ignition control mechanism 34 controls the ignition device and ignition system controls ignition timing so as to adjust the ignition timing to an optimum one, thereby reducing the discharge amount of air pollutant.

Further, in this embodiment, the diesel engine main body 42 is provided with an exhaust gas recirculating device (EGR), in which an exhaust reflux passage so is provided. In the emission-emphasized mode, the exhaust gas is recirculated to the combustion chamber of the diesel engine main body 42 through the exhaust reflux passage 50.

The exhaust reflux passage 50 is provided with an exhaust gas recirculation valve 45 and an exhaust gas recirculation cooler 46. In this case, the exhaust recirculation valve 45 adjusts the amount of exhaust gas recirculated so as to achieve an optimum exhaust gas recirculation ratio for each operating condition, thereby reducing the discharge amount of NOx, THC, CO, SPM, etc. The exhaust gas recirculation cooler 46 cools the exhaust gas used in the exhaust gas recirculation device (EGR) to decrease the maximum combustion temperature at the time of combustion, thereby reducing the amount of NOx discharged.

In the diesel engine main body 42 of this embodiment, two exhaust flow passages are formed in the exhaust pipe 47: an exhaust purifying passage portion 48 which is capable of purifying the exhaust gas from the engine 42, and an exhaust gas non-purifying passage portion 49 which allows the exhaust gas to be discharged without being purified.

The exhaust purifying passage portion 48 is provided with an exhaust throttle valve 43, an exhaust purifying catalyst 36, and an air pollutant removing filter 44. The exhaust throttle valve 43 enhances the back pressure of the exhaust gas to control the exhaust gas recirculation ratio, or enhances the engine load so as to improve the warming-up performance, thereby preventing generation of white smoke. In this embodiment, a catalyst for removing THC, CO, NOx, and SPM is used as the exhaust purifying catalyst 36 so as to be suitable for the diesel engine main body 42, and through the oxidation/reduction reaction thereof, the THC, CO, NOx, and SPM contained in the exhaust gas is removed. When the engine is a gasoline engine, 3-way catalyst is used.

The air pollutant removing filter 44 is an SPM removing filter, which reduces SPM (particulate matter) peculiar to the exhaust gas from the diesel engine main body.

The switching between the exhaust purifying passage portion 48 and the exhaust non-purifying passage portion 49 is effected by the exhaust flow passage switching means 35. Thus, when, in the emission-emphasized mode, switching to the exhaust purifying passage portion 48 is effected, and the exhaust gas is discharged through the exhaust purifying passage portion 48, the white smoke in the exhaust gas is reduced, and the THC, CO, NOx, and SPM are removed. When, in the output-emphasized mode, switching to the exhaust non-purifying passage portion 49 is effected, the exhaust gas is discharged without being passed through the exhaust purifying catalyst 36, etc.

The components of the exhaust gas purifying device 30 of this embodiment, such as the fuel injection control mechanism 32, the suction/exhaust valve control mechanism 33, the intake air flow passage switching means 31, and the exhaust flow passage switching means 35, are all controlled for operation by a control computer 41.

The control computer 41 controls on the basis of detection information obtained by the detecting means. When the detecting means detects that the aircraft is at rest on the ground with the engine running or that the aircraft is moving on the ground at low speed, the control computer 41 controls the above-mentioned components so as to set the engine in the emission-emphasized mode. On the other hand, when the detecting means detects that the aircraft is flying, the control computer 41 controls the above-mentioned components so as to set the aircraft in the output-emphasized mode.

The operation of the aircraft engine of this embodiment will now be described.

When the aircraft engine is running at idle or when the aircraft is performing so-called taxying at the time of taking off or after landing, all the components constituting the exhaust gas purifying device 30 are set to the emission-emphasized mode by the control computer 41, and operate so as to purify the exhaust gas from the diesel engine 42 to the utmost.

That is, the intake air flow passage switching means 31 is controlled and driven by the control computer 41, and provides a supply passage leading to the diesel engine 42 through the intake air heating device 38. As a result, the intake air throttle valve 39 adjusts the intake air amount so as to create a negative pressure on the intake manifold side, thereby making it possible to control the recirculation exhaust gas amount in the exhaust gas recirculating device (EGR). The intake air heating device 38 raises the temperature of the intake air, thereby preventing generation of white smoke and reducing the THC discharge amount.

And, the glow plug 40 operates to heat the combustion chamber of the diesel engine main body 42 to assist in effecting the ignition, preventing generation of white smoke when starting at low temperature or in a cold state, reducing the amount of THC discharged, and improving the fuel efficiency. Further, the fuel injection control mechanism 32, the suction/exhaust valve control mechanism 33, and the ignition control mechanism 34 provided in the diesel engine main body 42 are caused to operate by the control computer 41 in the mode which enables the exhaust gas to be purified.

That is, as described above, the fuel injection control mechanism 32 controls the fuel injection amount, the fuel injection timing (including the exhaust stroke injection, etc.), and the fuel injection pattern (injection ratio control in rectangular injection, pilot injection, two-stage injection, delta-type injection, etc.), reducing the discharge amount of THC, CO, NOx, SPM, smoke, $CO_2$, etc. through optimum fuel injection and combustion.

The suction/exhaust valve control mechanism 33 formed by the suction/exhaust valve timing variable mechanism realizes an optimum valve timing according to the operating condition. At low temperature or in a cold state, it delays the opening of the intake air valve to increase the intake air temperature in the cylinder, thereby preventing generation of white smoke. During idling or low-speed operation, it advances the closing of the intake air valve to prevent blow-by of the gas, and enhances the actual compression ratio to prevent generation of white smoke, reduce the amount of THC discharged, improve the fuel efficiency, etc. The ignition control mechanism 34 for the ignition device and ignition system controls the ignition timing, reducing the amount of air pollutant discharged through an optimum ignition time.

In the emission-emphasized mode, the exhaust gas recirculating device (EGR) operates, and the exhaust recirculating valve 45 of the exhaust reflux passage 50 provided in the diesel engine 42 adjusts the recirculating exhaust gas amount to achieve an optimum exhaust recirculation ratio for each operating condition, thereby reducing the discharge amount of NOx, THC, CO, SPM, etc. Further, the exhaust recirculation cooler 46 cools the exhaust gas used for exhaust gas recirculation, and lowers the maximum combustion temperature at the time of combustion, there by reducing the amount of NOx discharged.

And, the exhaust flow passage switching means 35 is controlled by the control computer to close the exhaust non-purifying passage portion 49, and opens the exhaust purifying passage portion 48. As a result, the exhaust gas discharged from the diesel engine main body 42 flows into the exhaust purifying passage portion 48. In this case, the exhaust throttle valve 43 provided in the exhaust purifying passage portion 48 enhances the back pressure of the exhaust gas to control the exhaust recirculation ratio, or enhances the engine load to improve the warming-up performance, thereby preventing generation of white smoke. Further, by means of the exhaust purifying catalyst 36, the THC, CO, NOx, and SPM contained in the exhaust gas are removed. Further, in the air pollutant removing filter 44, the SPM (particulate matter) peculiar to the exhaust gas from the diesel engine main body 42 is reduced.

In this way, when the aircraft engine is running at idle, or when the aircraft is performing so-called taxying at the time of taking off or after landing, the engine is in the emission-emphasized mode, and the exhaust gas is purified to the utmost by the exhaust gas purifying device 30 before it is discharged.

On the other hand, when a predetermined engine power is required, for example, when the aircraft is taking off or rising to a predetermined altitude, when it is cruising, or when it is landing, the control computer 41 sets the engine in the output-emphasized mode on the basis of the detection results obtained by the detecting means. In this mode, the intake air flow passage switching means 31 provides a supply passage in which the intake air directly flows into the diesel engine main body 42 from the air purifyer 37 without passing through the intake air heating device 38. As a result, the intake resistance of the intake air is minimum, and it is possible to output a maximum engine power. Further, it is possible to reduce the fuel consumption.

Further, the fuel injection control mechanism 32 is controlled by the control computer 41, and adjusts the fuel injection amount, the fuel injection timing and the fuel injection pattern such that a maximum output can be obtained. Similarly, the suction/exhaust valve control mechanism 33 is controlled by the control computer 41, and varies the suction/exhaust valve timing to set an optimum valve timing according to the operating condition. When the engine is running at high speed, the closing of the intake air valve is delayed to thereby increase the volumetric efficiency so that a maximum output may be obtained. Further, the ignition control mechanism 34 sets an optimum ignition time so that a maximum power may be output.

And, the exhaust flow passage switching means 35 is driven and controlled by the control computer 41 to open the exhaust non-purifying passage portion 49 and to close the exhaust purifying passage portion 48. Thus, the exhaust gas from the engine 42 is discharged through the exhaust non-purifying passage portion 49 without being purified by the exhaust purifying catalyst 36, etc. As a result, the exhaust gas is discharged without passing through the exhaust purifying catalyst 36, the exhaust throttle valve 43, and the filter 44, so that the back pressure when the exhaust gas is discharged is minimum, thus making it possible to obtain a maximum output and reducing the fuel consumption ratio. Thus, in the output-emphasized mode, a desired engine power is output, which means the normal flight can be effected without a hitch.

While in the above-described embodiment the diesel engine main body 42 is provided with all of the following components of the means for removing the air pollutant from the exhaust gas: the components of the exhaust gas purifying device 30, such as the fuel injection control mechanism 32, the intake air flow passage switching means 31, and the exhaust flow passage switching means 35, this should not be construed restrictively. It is only necessary for the diesel engine main body 42 to have minimum ones of the components required for removing the air pollutant from the exhaust gas.

That is, it is possible, for example, for the aircraft engine to have only the intake air heating device 38, the intake air passage having the intake air heating device 38, and the intake air flow passage switching means 31. In this case, when the aircraft engine is running at idle or the aircraft is taxying before taking off, the engine is set to the emission-emphasized mode on the basis of the judgment of the control computer 41, and the intake air flow passage switching means 31 is set such that the intake air flows by way of the intake air heating device 38, the exhaust gas being purified.

After the aircraft has taken off, the engine is switched to the output-emphasized mode by the judgment of the control computer 41, and the intake air flow passage switching means 31 is set such that the intake air is directly supplied to the diesel engine main body 42 without flowing by way of the intake air heating device 38 to thereby obtain the predetermined engine output.

In this way, if, for example, there are only provided the intake air heating device 38, the intake air passage having the intake air heating device 38, and the intake air flow passage switching means 31, and there are no other components constituting the exhaust gas purifying device 30, the exhaust gas is purified to a sufficient degree. Thus, even when there are not provided all the components capable of purifying the exhaust gas, it is possible to purify the exhaust gas without increasing the weight of the engine. On the other hand, when, as in this embodiment, all the components are provided, it is possible to remove the air pollutant in the exhaust gas with maximum efficiency.

Further, while in the above-described embodiment the engine main body consists of a diesel engine, the engine may also be an Otto cycle engine. In the case of an Otto cycle engine, 3-way catalyst is used as the exhaust purifying catalyst.

Further, the above embodiments described in this specification should not be construed restrictively. Various modifications are possible without departing from the scope of the claims.

What is claimed is:

1. An aircraft engine for use with an aircraft comprising an exhaust gas purifying device for purifying exhaust gas from the engine, and a switching means for switching the engine between an emission-emphasized mode in which the exhaust gas from the engine is purified by the exhaust gas purifying device and an output-emphasized mode in which emphasis is placed on engine output, wherein the switching means is controlled on the basis of detection results obtained by detecting means for detecting whether the aircraft is in a pre-take off/post-landing state or a flight state, and wherein when the aircraft is in the pre-take off/post-landing state, the engine is operated in the emission-emphasized mode, and when the aircraft is in the flight state, the engine is operated in the output-emphasized mode.

2. An air craft engine according to claim 1, wherein the detecting means detects whether the aircraft is at rest on the ground with the engine operating, or the aircraft is moving on the ground at low speed, or the aircraft is flying, wherein when the detecting means detects that the aircraft is at rest on the ground with the engine operating, or it is moving on the ground at low speed, the engine is operated in the emission-emphasized mode, and wherein the detecting means detects that the aircraft is flying, the engine operation is switched to the output-emphasized mode.

3. An aircraft engine according to claim 1, wherein the exhaust gas purifying device is provided so as to be branched off from a first exhaust passage for discharging the exhaust gas to the exterior of the aircraft, and has a second exhaust passage for discharging the exhaust gas to the exterior of the aircraft and an exhaust purifying catalyst provided in the second exhaust passage.

4. An aircraft engine according to claim 1, wherein the switching means is provided at the branch point between the first exhaust passage for discharging the exhaust gas to the exterior of the aircraft and the second exhaust passage having the exhaust purifying catalyst and adapted to discharge the exhaust gas after purifying it, and is formed by an exhaust flow passage switching means capable of introducing the exhaust from the engine into the first exhaust passage or the second exhaust passage.

5. An aircraft engine according to claim 1, wherein the detecting means is provided outside the aircraft and formed by a wing-like member adapted to be operated by an airflow from the front side of the aircraft.

6. An aircraft engine according to claim 4, wherein the exhaust flow passage switching means is driven by the wing-like member, wherein when the aircraft is in the pre-takeoff or post-landing state, the wing-like member does not operate and the exhaust flow passage switching means is arranged at the branching point so as to be capable of introducing the exhaust gas into the first exhaust passage, and wherein when the aircraft is in the flight state, the wing-like member is operated by lift to drive the exhaust flow passage switching means, the exhaust flow passage switching means being arranged at the branching point so as to be capable of introducing the exhaust gas into the second exhaust passage.

7. An aircraft engine according to claim 1, wherein the switching means is provided with an intake air heating device and an intake air throttle valve, and wherein there is provided an intake air flow passage switching means capable of switching between an intake air passage for supplying intake air to the engine main body by way of the intake air heating device and an intake air passage for supplying intake air to the engine main body without passing it through the intake air heating device and the intake air throttle valve.

8. An aircraft engine according to claim 1, wherein the exhaust gas purifying device is provided in the intake air passage for supplying intake air to the engine main body, and is formed by the intake air heating device capable of raising the temperature of the intake air.

9. An aircraft engine according to claim 1, wherein the engine is formed by a diesel engine, and wherein the exhaust gas purifying device is formed by a glow plug for heating a combustion chamber of a diesel engine main body.

10. An aircraft engine according to claim 1, wherein the exhaust gas purifying device is formed by a fuel injection control mechanism capable of controlling the fuel injection state so as to reduce the discharge amount of air pollutant in the exhaust gas.

11. An aircraft engine according to claim 1, wherein the exhaust gas purifying device is formed by a suction/exhaust valve control mechanism capable of controlling the valve timing to change so as to reduce the discharge amount of air pollutant in the exhaust gas.

12. An aircraft engine according to claim 1, wherein the exhaust gas purifying device is formed by an ignition control mechanism capable of changing the ignition period so that the discharge amount of air pollutant in the exhaust gas may be reduced.

13. An aircraft engine according to claim 1, wherein the exhaust gas purifying device is formed by an exhaust gas recirculating device which recirculates the exhaust gas to use it as intake air.

14. An aircraft engine according to claim 13, wherein the exhaust gas recirculating device has an exhaust gas recirculating valve.

15. An aircraft engine according to claim 13, wherein the exhaust gas recirculating device is provided with an exhaust gas recirculating cooler.

16. An aircraft engine according to claim 13, wherein in the exhaust gas recirculating device, the amount of exhaust gas recirculated is controlled by the intake air throttle valve.

17. An aircraft engine according to claim 1, wherein the exhaust gas purifying device is formed by an exhaust throttle valve which is provided in the second exhaust passage, and is capable of increasing the back pressure of the exhaust gas.

18. An aircraft engine according to claim 1, wherein the exhaust gas purifying device is formed by an air pollutant removing filter which is provided in the second exhaust passage.

* * * * *